3,169,204
AXIAL AIR GAP MACHINES
Georges Moressee, Neuilly-sur-Seine, and Robert Dechet, Boulogne-sur-Seine, France, assignors to Normacem S.A., Paris, France, a body corporate of France
Filed June 10, 1960, Ser. No. 35,205
Claims priority, application France, July 31, 1959, 901,692, Patent 1,240,693
7 Claims. (Cl. 310—268)

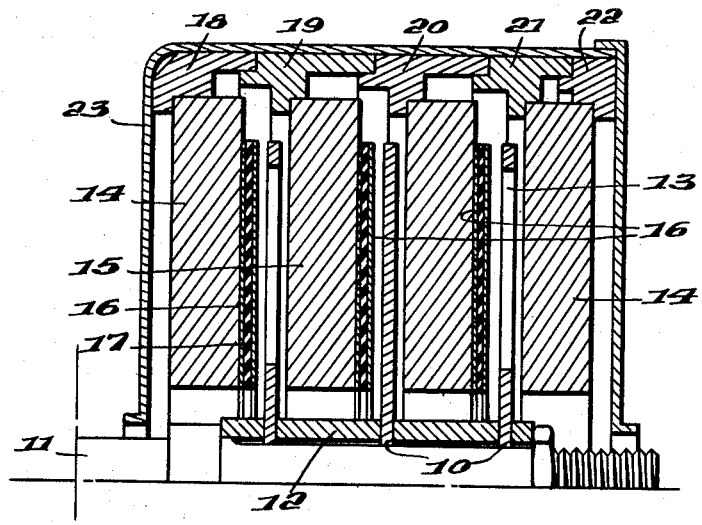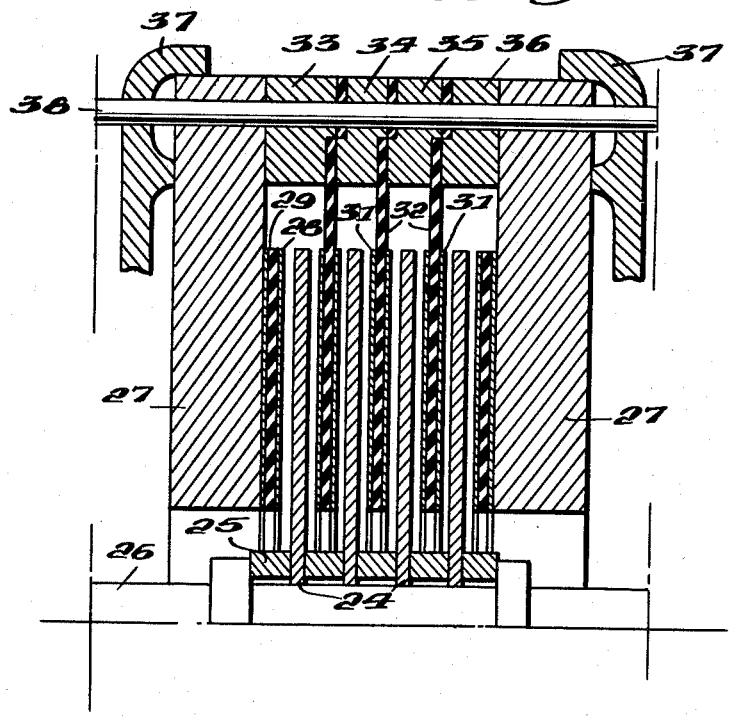

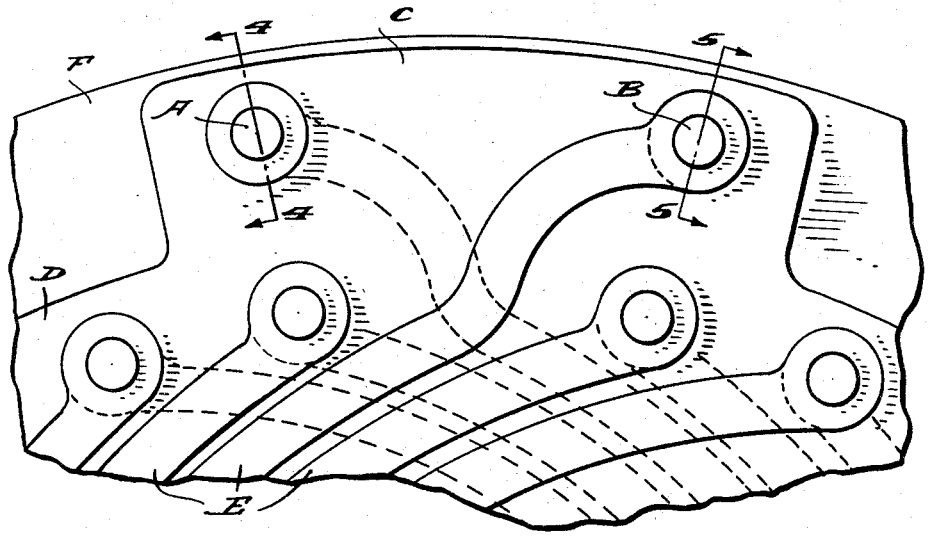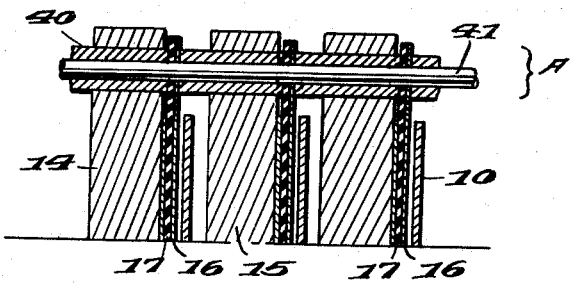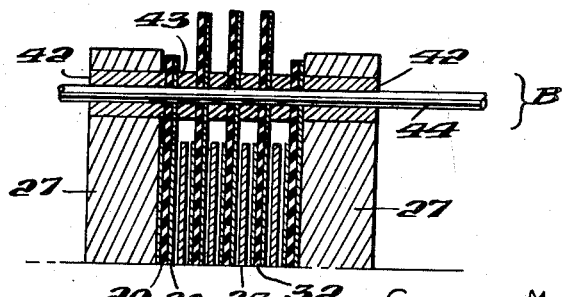

This invention relates generally to axial air gap machines and more particularly to axial air gap machines having a plurality of rotor disks mounted upon a single shaft for rotation between spaced stator elements.

While it is generally known in the rotary electrical machine art to provide a plurality of rotor elements secured to a single shaft for rotation relative to stator elements, the present invention is directed toward an improved electrical apparatus having a relatively small size, simplified assembly and manufacture, and a large range of power and operational variations.

According to the present invention the rotory electrical machine comprises a plurality of thin disk-shaped rotor elements secured to a common shaft for rotation in axial air gaps between spaced stator elements, at least some of said elements including windings of the type consisting of a disk of insulation material having flat coil sides of the winding on both sides thereof. The thin flat coil sides may be applied to the insulation disk in various known manners, as for example, by gluing, by known printed circuit techniques, and the like.

Among the several advantages afforded by the improved machine might be mentioned a material reduction in the axial dimensions of the apparatus without any corresponding reduction in diameter. Another advantage of the invention resides in a desirable reduction in the inertia of the rotary element. Variations in power rating and in operating conditions may also be readily achieved in accordance with the manner of electrical connection of the elements, speed of operation, and the like.

Thus the primary object of the present invention resides in the provision of a rotary electrical machine having a plurality of rotor disks secured to a common shaft for rotation in planar air gaps between spaced stator elements, at least some of said elements being provided with electrical windings of the type having flat coil sides on opposite surfaces of an insulation disk.

A more specific object of the invention resides in the provision of a direct-current machine having a stator including at least two magnetic circuits each provided with a plurality of angularly arranged successive north and south polar regions, and a plurality of rotor disks secured to a single shaft for rotation in planar air gaps between stator elements of the separate magnetic circuits, respectively.

Another object of the invention resides in the provision of an alternating-current machine having a plurality of axially-spaced stator elements between which is defined planar air gaps, and a plurality of rotor elements secured to a common shaft for rotation between said stator elements, at least some of said elements including windings of the type having flat coil sides on opposite surfaces of insulating supporting disks.

Other objects and advantages of the present invention will become more apparent from a study of the following specification when considered in conjunction with the accompanying drawings, in which:

FIG. 1 is a partial axial section of an embodiment of the invention as applied to a multi-polar machine of the alternating current type;

FIG. 2 is a view similar to FIG. 1 showing a somewhat different multi-polar machine of the alternating current type to which the inventive concept has been applied;

FIG. 3 is a partial schematic view showing the connections for a stator winding of an alternating current type machine;

FIG. 4 is a partial section view taken on line 4—4 of FIG. 3 for an embodiment of the invention according to FIG. 1; and FIG. 5 is likewise a partial section view on line 5—5 of FIG. 3 for an embodiment of the invention according to FIG. 2.

With reference now to the drawings and to FIG. 1 in particular, the alternating current multi-polar machine is seen to be comprised of three thin rotor disks 10 secured to a single shaft 11 by means of a sleeve 12 for rotation in planar air gaps between axially spaced stator elements. The disks 10 are mounted correspondingly in axially spaced relation along the sleeve 12. The rotor disks 10 are of the squirrel-cage type having slots 13, although they could equally well be designed to be solid, thin sheets of the hysteresis type.

The stator is comprised of two annular magnetic end yoke members 14 of soft ferrite and two annular intermediate yoke members 15, also of soft ferrite. On each of the annular members is secured, with the interposition therebetween of a thin layer of insulation, a flat electrical winding 16 established on opposite faces of a thin, insulating disk 17. The yoke members 14, 15 are mounted in annular recess portions of annular support members 18, 19, 20, 21 and 22 arranged concentrically about rotor shaft 11. These members are enclosed by a housing 23 which also supports the bearing means for the shaft.

The multi-polar alternating current machine illustrated in FIG. 2 comprises four thin disk-type rotors 24 secured in axially spaced relation on sleeve 25 which in turn is secured upon the motor shaft 26. As in the construction according to FIG. 1, the rotor disks 24 rotate in planar air gaps between annular stator elements and these disks can be of the slotted squirrel cage type or of the hysteresis type, in which case they would be composed of thin solid metallic sheets.

The stator element includes two annular magnetic members 27 of soft ferrite to each of which is secured, with the interposition of a thin layer of insulation a flat electrical winding 28 established on opposite faces of a thin, insulating disk 29. The stator further includes three other stator windings 31 arranged in the annular, flat spaces between rotor disks 24. These stator windings are not backed by any ferrite support, as is the case in the embodiment of FIG. 1, but each is composed of two sections located on opposite faces of an annular disk 32, these disks being secured in the proper axially spaced relation by and between spacer members 33, 34, 35 and 36 which are in turn clamped between the annular magnetic members 27. Housing parts 37 engage the outer faces of the magnetic members 27 and the whole assembly is pressed together by means of a plurality of bolts 38, only one of which is shown.

FIGS. 3–5 show various examples of the coupling and connection means for the embodiments illustrated in FIGS. 1 and 2.

With reference now to FIG. 3, which applies to both FIGS. 1 and 2, the output terminals A and B of a flat winding, having coil sides E on opposite faces of a disk D of insulating material, are located on opposite faces of a projecting portion C of the disk which is secured to the adjacent face of a soft ferrite stator member F. In the FIG. 1 embodiment, insulating disk D corresponds to disk 17 and winding E is noted by numeral 16. The ferrite member F corresponds to the ferrite members 14 and 15. In the FIG. 2 embodiment, insulating disk D corresponds to disk 29 and winding E is noted by numeral 28. The ferrite member F corresponds to the ferrite members 27.

With respect to the embodiment of FIG. 1, a different portion of which is shown in FIG. 4, the coupling at terminal A of the three elementary electric stator circuits is illustrated as being effected by means of conductive connection sleeves 40 which connect the electric circuits in parallel. These sleeves 40 pass through bores in the annular ferrite stator elements 14, 15. Metal rods 41 pass through these sleeves 40 and are threaded at their ends to receive nuts, not illustrated, by means of which the sleeves 40 and projecting portions of the disks 17 are clamped together. One of the sleeves 40 at one end of terminal A will serve, in known manner, as a general current connection to the machine.

With respect to the embodiment of FIG. 2, a different portion of which is shown in FIG. 5, the coupling at terminal B for the several stator winding circuits, FIG. 3, is illustrated as being effected by means of the conductive sleeves 42 which pass through bores in the annular ferrite stator elements 27 and by a plurality of intermediate conductive sleeves 43 disposed between the radially projecting portions of the winding support disks 32. Clamping together of the sleeves 42, 43 and support disks 32 is achieved by the rods 44 which pass through these sleeves and tightening nuts, not shown, threaded onto the opposite ends of the rods.

Depending upon whether or not the sleeves are made of conductive or insulating material and depending upon the presence or absence of metallized jumper connections inside the holes at terminals A and B, any desired type of connections may be made between the several windings disposed on the axially spaced stator elements of the machine. Although the magnetic members have been described as being made from a soft ferrite, it is evident that other magnetically equivalent structures could be utilized equally as well, as for example, spiral-wound sheet metal elements. It is also apparent that the number of rotor and stator elements may be varied, as desired, without departing from the scope of the present invention.

While in accordance with the provisions of the patent statutes we have illustrated and described the best forms and embodiments of the invention known to us, it will be apparent to those skilled in the art that other changes and modifications may be made in the apparatus described without deviating from the scope of the invention set forth in the following claims.

We claim:

1. An axial air gap alternating current machine comprising a frame, a rotor shaft rotatably mounted in said frame, a plurality of axially-spaced annular stator elements of magnetic material arranged concentrically about said rotor shaft in axially spaced relation, a plurality of thin planar rotor disks arranged respectively intermediate said stator elements and spaced therefrom by planar air gaps, said rotor disks being secured to said rotor shaft, at least some of said stator elements each including on one face thereof a stator winding having thin flat coil sides secured to opposite faces of an insulation disk, each said insulation disk including at least one outer peripheral portion thereof extending radially outward beyond the periphery of said rotor disks and having at least one terminal of said stator winding on said outer peripheral portion located at an aperture extending axially through said outer peripheral portion, spacer sleeves located between the outer peripheral portions of adjacent insulation disks and aligned with the apertures in said outer peripheral portions, and a rod extending through said sleeves and outer peripheral portions for clamping said insulation disks together in parallel spaced relation as a unit.

2. An axial air gap alternating current machine as defined in claim 1 wherein at least one of said spacer sleeves is made of electrically conductive material and the opposite ends thereof abut terminals of the respective stator windings on adjacent insulation disks to thus interconnect said terminals electrically.

3. An axial air gap alternating current machine as defined in claim 1 wherein said spacer sleeves also pass through corresponding aligned apertures in said stator elements.

4. An axial air gap alternating current machine as defined in claim 1 wherein the outer peripheral portion on each insulation disk includes two spaced terminals of the respective stator winding thereon located correspondingly at spaced apertures extending axially through said outer peripheral portion, and wherein said spacer sleeves and a clamping rod are provided for each said terminal.

5. An axial air gap alternating current machine as defined in claim 1 which further includes at least one additional stator winding having thin flat coil sides secured to opposite faces of an insulating disk also having an apertured outer peripheral portion and winding terminal thereon and wherein last said disk is not applied to one face of a stator element but is held in spaced relation by the outer peripheral portion thereon and said spacer sleeves.

6. An axial air gap alternating current machine as defined in claim 1 wherein said aperture in said outer peripheral portion of said insulation disk is metallized with conductive material and said terminal on said stator winding is electrically connected with said metallized aperture.

7. An axial air gap alternating current machine comprising a frame, a rotor shaft rotatably mounted in said frame, a plurality of axially-spaced annular stator disks of insulating material arranged concentrically about said rotor shaft in axially spaced relation, a plurality of thin planar rotor disks arranged respectively intermediate said stator disks and spaced therefrom by planar air gaps, said rotor disks being secured to said rotor shaft, said stator disks each including a stator winding having thin flat coil sides secured to opposite faces thereof, said stator disks also including at least one outer peripheral portion extending radially outward beyond the periphery of said rotor disks and having at least one terminal of said stator winding thereon located at an aperture extending axially through said outer peripheral portion, spacer sleeves located between the outer peripheral portions of adjacent stator disks and aligned with the apertures in said outer peripheral portions, and a rod extending through said sleeves and outer peripheral portions for clamping said stator disks together in parallel spaced relation as a unit.

References Cited by the Examiner

UNITED STATES PATENTS

| 2,773,239 | 12/56 | Parker | 324—114 X |
| 2,970,238 | 1/61 | Swigget | 310—268 |
| 3,054,011 | 9/62 | Silverschotz et al. | 310—268 |
| 3,056,056 | 9/62 | Baudot | 310—268 |

OTHER REFERENCES

"D.C. Motor Has Printed Armature," Electronics, March 20, 1959, pages 70, 72, 73.

MILTON O. HIRSHFIELD, *Primary Examiner.*